(12) United States Patent
Scruggs et al.

(10) Patent No.: US 12,153,980 B1
(45) Date of Patent: Nov. 26, 2024

(54) INTERACTIVE CORE FOR ELECTRONIC CARDS

(71) Applicant: Interactive Cards, Inc., Lakeland, FL (US)

(72) Inventors: Michael Scruggs, Lakeland, FL (US); Uwe Trueggelmann, British Columbia (CA)

(73) Assignee: InterActive Cards, Inc., Lakeland, FL (US)

( * ) Notice: Subject to any disclaimer, the term of this patent is extended or adjusted under 35 U.S.C. 154(b) by 94 days.

(21) Appl. No.: 17/841,392

(22) Filed: Jun. 15, 2022

Related U.S. Application Data

(63) Continuation-in-part of application No. 17/221,773, filed on Apr. 3, 2021, now Pat. No. 11,392,189, which is a continuation-in-part of application No. 16/166,557, filed on Oct. 22, 2018, now Pat. No. 10,970,612.

(51) Int. Cl.
*G06K 19/07* (2006.01)
*G06K 19/077* (2006.01)

(52) U.S. Cl.
CPC ... *G06K 19/0709* (2013.01); *G06K 19/07773* (2013.01)

(58) Field of Classification Search
CPC ........ G06F 1/266; H01Q 1/2283; H05K 1/18; H05K 2201/10037; H05K 2201/10098; H05K 2201/10212; H05K 2201/2036; G06K 19/0709; G06K 19/07773
See application file for complete search history.

(56) References Cited

U.S. PATENT DOCUMENTS

| 10,255,734 | B2* | 4/2019 | Cox | .................... G06K 19/0712 |
| 2016/0203399 | A1* | 7/2016 | Cox | ....................... B32B 37/185 |
| | | | | 156/275.5 |
| 2017/0244823 | A1* | 8/2017 | Kim | ......................... H04B 5/72 |

FOREIGN PATENT DOCUMENTS

CA 2776046 A1 * 4/2011 ....... G06K 19/07732

* cited by examiner

*Primary Examiner* — Sonji N Johnson
(74) *Attorney, Agent, or Firm* — Nicholas Pfeifer; Smith & Hopen, P.A.

(57) ABSTRACT

Antenna and power control electrical circuits are configured for use with an initialization antenna for activating and personalizing an electronic core for electronic cards. When the antenna receives an RF signal, it turns on the power and redirects additional signals to a CPU. If the signal is validated, personalization information can be downloaded or self-diagnostic QC software can be activated; if a signal is not validated, the control circuits are reset. Once initialization is completed, the antenna control circuit is deactivated, and the power control circuit electrically connects the batter to the CPU.

14 Claims, 4 Drawing Sheets

SECTION A-A
SCALE 1 : 1

DETAIL A
SCALE 32 : 1

DETAIL B
SCALE 8 : 1

INTERACTIVE CORE FOR ELECTRONIC CARDS

CROSS REFERENCE TO RELATED APPLICATIONS

The present application is a continuation of U.S. Ser. No. 17/221,773, filed Apr. 3, 2021, which is a continuation-in-part of U.S. Ser. No. 16/166,557, filed Oct. 22, 2018, issued as U.S. Pat. No. 10,970,612 on Apr. 6, 2021, the disclosure of all of which are specifically incorporated herein by reference in their entireties.

FIELD OF THE INVENTION

The present application is in the field of manufacturing cards the size of a credit card and, more particularly, to the manufacture of cards with EMV chips and electronic components.

BACKGROUND OF THE INVENTION

Credit and payment cards manufactured today often include EMV chips and there is a need to be able to efficiently manufacture such cards and electronic cards with a power source, an EMV chip (or not) and other electronics that still comply with strict quality control standards required by card issuing organizations.

It is known to make pre-lamination cores capable of being manufactured into electronic cards through use of conventional card making equipment in which printed overlays and laminate can be applied to the pre-lamination core as is described in U.S. Pat. Nos. 7,959,085, 8,657,983 and 8,727,224, the disclosures of which are specifically incorporated herein by reference.

The instant invention seeks to advance the art of pre-lamination cores.

SUMMARY OF THE INVENTION

In accordance with the present invention, antenna and power control electrical circuits are configured for use with an initialization antenna for activating and personalizing an electronic core. The power control electrical circuit is configured so that when it is in an initial power state the power source is in an off power state and the power source will not switch to an on power state until the power control electrical circuit receives an activation signal from the antenna control electrical circuit. The antenna control electrical circuit is configured so that when it is in an initial antenna control state the antenna control electrical circuit will send the activation signal to the power control electrical circuit when an external energy field causes the antenna control electrical circuit to generate the activation signal. When the activation signal is generated and received, the power source will be electrically connected to the CPU in the electronic core and additional signals generated from RF signals sent to the initialization antenna will be sent to the CPU. If additional RF signals are validated (as opposed to noise RF signals), the validated signal will go to the CPU. If the validated signal is for use in personalization, personalization data will be downloaded into memory; if the validated signal is for use in quality control during manufacturing, it will trigger a self-diagnostic software program. If additional RF signals are not validated, then the antenna and power electrical circuits will be reset to their initial states. Once personalization is complete, the CPU will cause the antenna control electrical circuit to change to a disconnected state in which it will not send any signal to the power control electrical circuit or the CPU and cause the power control circuit to change to a permanent power state in which the power source is electrically connected to the CPU.

This and further objects and advantages of the present invention will be apparent to those skilled in the art in connection with the drawing and the detailed description of the invention set forth below.

BRIEF DESCRIPTION OF THE DRAWINGS

FIG. 1B is a non-exploded top plan view of the electronic core of FIG. 1A while

DETAILED DESCRIPTION OF THE INVENTION

Figure 1A:
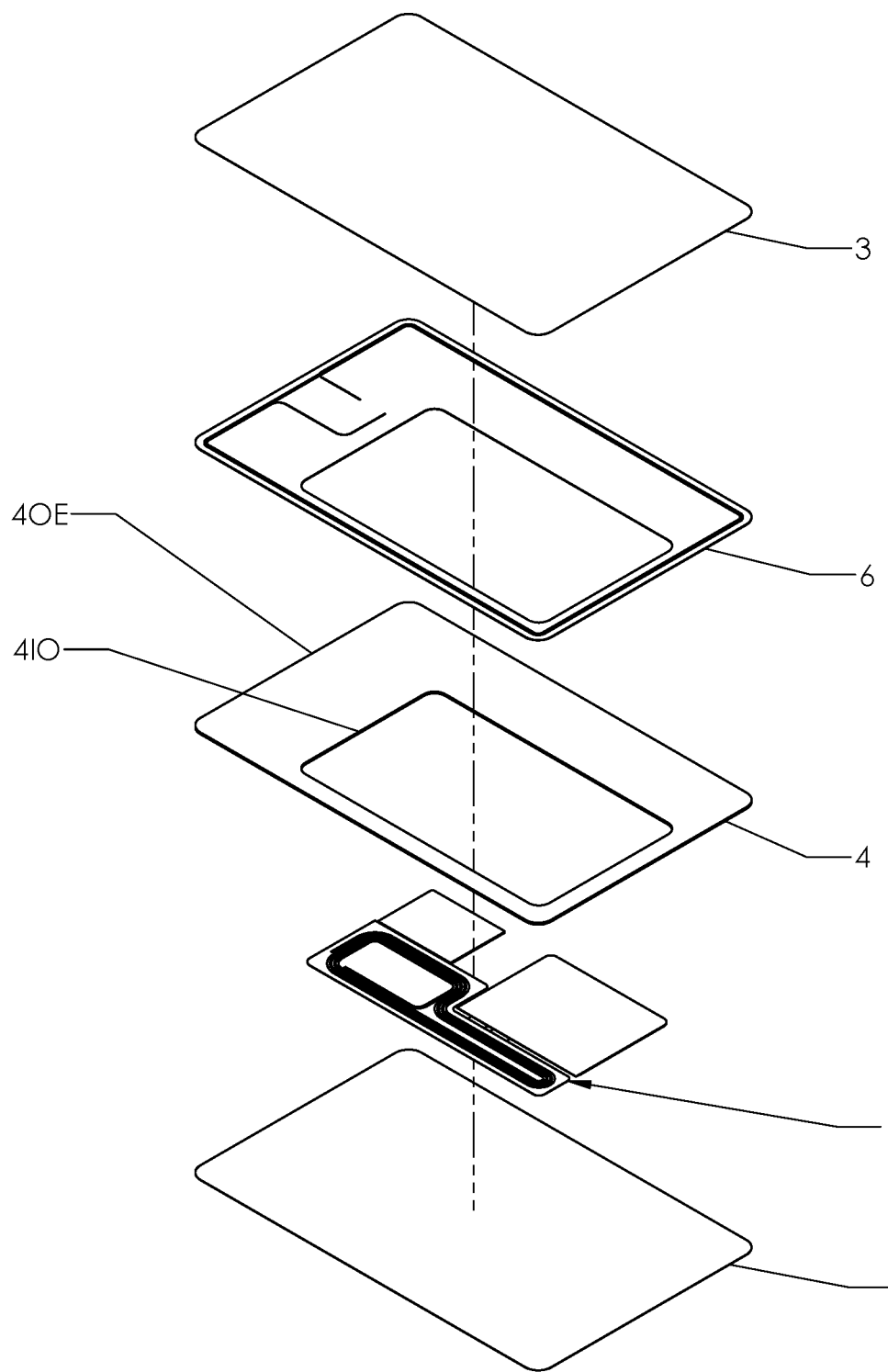
FIG. 1A is an exploded view which illustrates an electronic core in accordance with the present invention.
Figure 1B:
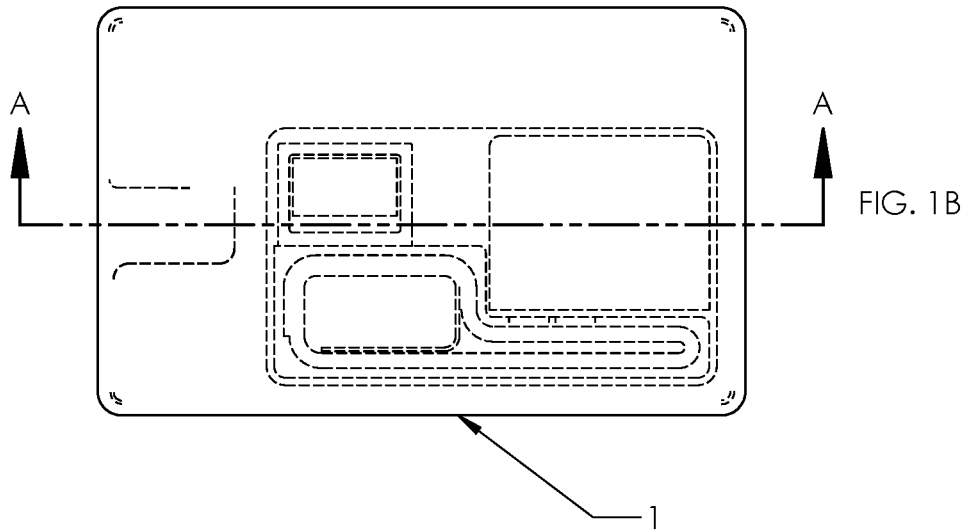
Figure 1C:
FIG. 1C is a cross section view of FIG. 1B.
Figure 1D:
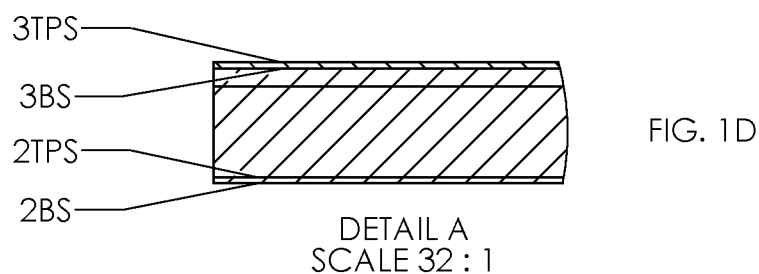
FIGS. 1D and 1E are enlarged partial cross section views showing detail of A in FIG. 1C, FIG. 1D having a scale of 32:1, FIG. 1E having a scale of 8:1.
Figure 1E:
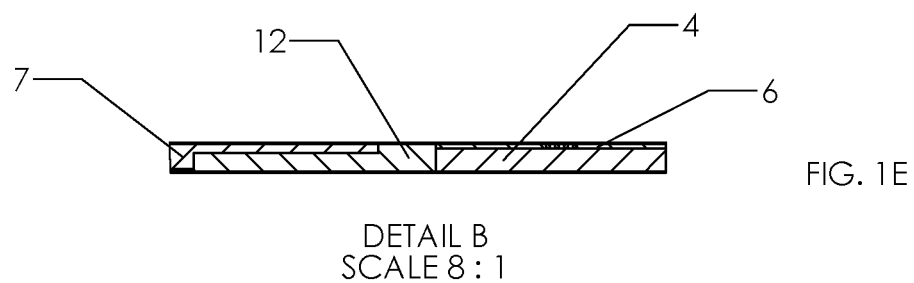
Figure 1F:
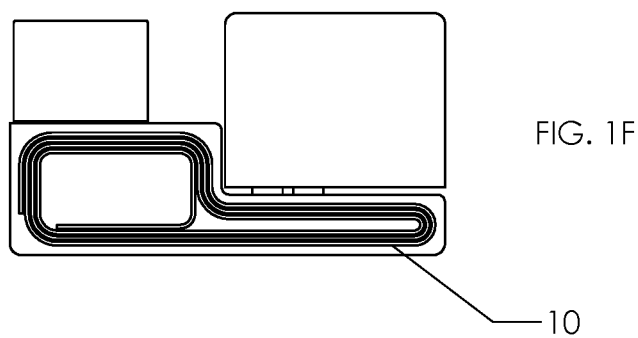
FIGS. 1F and 1G illustrate bottom and top plan views of an interactive core which can be used in the electronic core illustrated in FIG. 1A.
Figure 1G:
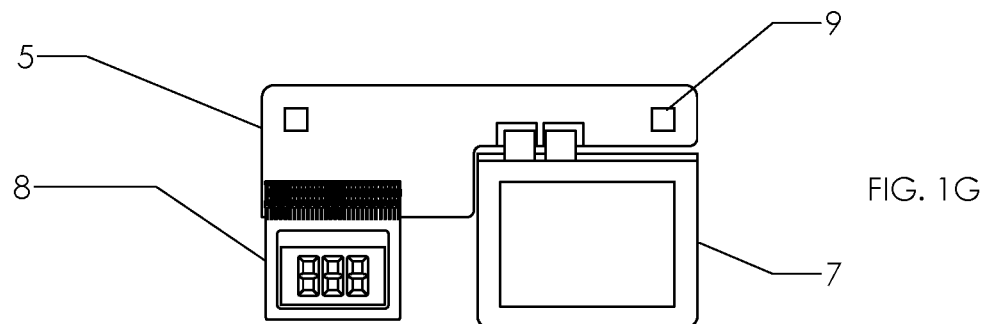

In connection with the present invention, the term "interactive core" shall be used to define a thin inlay that can be supplied to manufacturers for finishing cards using traditional manufacturing methods. The interactive core contains components such as batteries, processors, displays, biometric sensors and other devices necessary to construct an ISO ID-1 compliant card with interactive features. Devices manufactured using the interactive core inlay can be used as cards, tags or other devices used for financial transactions, transportation access, secure access, and other applications.

In accordance with the present invention, the interactive core concept leverages the benefits of a reactive injection molding process for embedding sensitive electronic components in a card form factor while leveraging the finishing, personalization and distribution capacity that exists among traditional card manufacturers.

The invention described herein requires that the interactive core be finished with equipment already in place or readily available to the card manufacturing industry. Accordingly, to better understand the present invention, traditional card manufacturing techniques are described here so the special features of interactive core can be more easily understood.

Cards, in a simple form, consist of three layers: 1) a core of rigid PVC, typically white, upon which images are printed using offset or digital printing techniques; 2) a clear PVC rear overlay typically with magnetic stripe material pre-laminated in place; and 3) a clear PVC front overlay. The three layers are laminated together as sheets of a size large enough to make an array of cards in 3×5, 3×7, and other formats.

Post lamination individual cards are separated from the sheets using precision die punch equipment and collected into magazines.

Holograms and signature panels are then hot stamped onto the surface of the card using hot stamp equipment fed by magazines previously filled by the punching equipment.

Cards having holograms and signature panels applied are returned to magazines for subsequent personalization processing.

Cards are personalized by applying personal information such as name, account number, expiry date and security code to the magnetic stripe and the surface of the card. Magnetic media is encoded using an encoding module. Numerous methods exist for applying personal data to the surface of the card:

- Most commonly name, account number and expiry date are applied by an embossing process performed by a module common to all personalization equipment manufacturers. The security code is applied by a similar indent marking module.
- Laser marking is an alternate method for surface personalization.

UV curing inks are also used for surface personalization. After personalization, cards are packaged with documents and other fulfillment materials for mailing to the customer. Printers, card adhesive stations, folders and envelop stations are common fulfillment modules on card personalization equipment.

Transactions via payment module, or chip, require additional manufacturing process steps. The payment module which includes a contact plate for interfacing payment terminals and an attached microcontroller known as a payment controller is installed after punching and before personalization. The payment module is installed by machines that mill a pocket in the card into which the payment module is placed and usually affixed using a hot melt adhesive.

Contactless transactions require further manufacturing steps. The three-layer construction is modified to include at least an additional core layer which has antenna wire embedded in it or alternately applied by some form of deposition. The antenna wire is then connected to terminals on the payment module. During payment module installation additional features are milled to access the antenna wire ends which are then connected to the terminals on the payment module using conductive adhesive. There is an alternate method using a coil on the backside of the payment module called coil on module.

This description will now focus on traditional card manufacturing techniques and the special features incorporated into the interactive core of the present invention to facilitate finishing and personalization using common card finishing and personalization equipment.

The interactive core of the present invention will require specialized features to allow the use of existing equipment for the finishing and personalization of cards.

- Printing. Leveraging current card manufacturers' capability to offset print onto PVC is critical to the success of interactive core. Typically, the offset presses used by card manufacturers are sheet fed units which have issues handling sheets (under 125 μm). To create a card meeting ISO thickness standards the total thickness of the interactive core will be less than 0.5 mm.
- Lamination. The interactive core inlay must be compatible with existing equipment used to laminate printed sheets to the core. The temperatures, however, need to be lower to protect the electronic components embedded within the core. Therefore, the outer layers of the interactive core will be a thin (25 μm) thermally activated adhesive that will be compatible with traditional PVC overlays and meet the industry requirements for peel strength and thermal resistance.
- Card Separation. Within the two outer adhesive layers will be a PVC (or other typical card material) frame. The frame will have a cavity away from the edges that will house the electronics and will be filled with polyurethane using RIM (see U.S. Pat. No. 8,657,983). The frame material in combination with the overlay materials is meant to create a card perimeter that presents materials for which existing, standard die punch machines are designed to process.
- Payment Module Installation. In one embodiment the area of the card defined for contact locations will be part of the PVC frame. Again, the logic is to present material in the area of the payment module for which existing milling equipment, cutters and adhesives are designed to process. Other embodiments could include embedding the payment module in an area within the frame that has been filled with polyurethane via the RIM process. Testing will have to be performed to determine the compatibility with existing processing methods.
- Antenna for Contactless Transactions. The PVC frame will be modified for cards designed for contactless transactions. During interactive core construction the frame will be made thinner and a commercially available antenna inlay will be laminated to the frame. Alternately, the antenna could also be embedded directly into the frame.
- Antenna for Activation and Personalization. The printed circuit board assembly will include a separate antenna designed to function per the ISO/IEC 14443 specification, the contents of which is specifically incorporated herein by reference in its entirety, that will be used specifically for activating and personalizing the card. The antenna on the card is not used for transactions and in this embodiment is not electrically connected to the payment module or payment antenna. The personalization antenna can be used for at least three purposes.
- Circuit Activation. It is desirable to have the battery disconnected from any load while sheets of interactive cores are being stored by a manufacturer of interactive cores or customers for interactive cores. A circuit can be designed that allows the battery to be disconnected from the battery until a unique RF signal is received to permanently and irreversibly connect the battery to the card control circuit; one example of such a circuit is a latching circuit.
- Personalization. Elements on the card that require personalization can be personalized after circuit activation. In one embodiment the card will contain a display for presenting a dynamic security code. In this embodiment an IC referred to as a card controller will be attached to the to the personalization antenna. Data such as algorithm seed data can be transmitted to the card controller during the personalization process.
- Post Personalization. A final code can be sent to the card controller via the personalization antenna as the final step in the personalization process to program the card controller to ignore any signals detected by the personalization antenna.

Simplified card personalization steps follow. Note some of the steps may be performed in different orders.

1. Personalize the payment controller.
2. Read the payment controller and seed/program the card controller with the appropriate Dcvx data or other data as the card design requires.
3. Read the payment controller and encode the magnetic stripe with the appropriate data.
4. Read the payment controller and perform surface personalization with the appropriate data.

The invention will now be described in even greater detail by reference to an especially preferred embodiment illustrated in FIGS. 1A-1F. In the Figures and the following description, number designations indicate various features of the invention, with like number designations referring to like features throughout both the drawings and the description. Although the Figures are described in greater detail below, the following is a glossary of the elements identified in the FIGS. 1A-1F.

1 electronic core
2 rear adhesive layer
2TPS top planar surface of rear adhesive layer
2BS bottom planar surface of rear adhesive layer
3 front adhesive layer
3TPS top planar surface of front adhesive layer
3BS bottom planar surface of front adhesive layer
4 stiffening spacer
410 interior opening of stiffening spacer
40E outer edge of stiffening spacer
5 printed circuit board (PCB)
6 antenna inlay
7 battery
8 screen
9 central processing unit (CPU)
10 initialization antenna
11 interactive core
12 polyurethane Electronic core 1 has front and rear adhesive layers 3, 2, each of which has a top planar surface TPS and a bottom planar surface BS. Located in between front and rear adhesive layers 3, 2 is stiffening spacer 4 which has interior opening 410 and outer edge 40E. An antenna inlay can also be included with stiffening spacer 4. Interior opening 410 holds interactive core 11.

Interactive core 11, in an especially preferred embodiment, has battery 7 and screen 8 electrically connected to PCB 5 and CPU 9 is mounted to PCB 5. Initialization antenna 10 is either mounted or formed in PCB 5. The portion of interior opening 410 that does not contain electronic components is filled with polyurethane 12.

This now brings us to the new disclosure set forth in connection with the present invention.

The interactive core already described requires two specialized electrical circuits. The first circuit controls the function of the antenna. The second circuit controls the function of the battery.

An advantageous feature of an interactive core is the ability to keep the battery disconnected from the circuit until a card manufactured from the core is about to ship to a customer. Further, non-contact means to control the battery and to seed cryptographic keys into the CPU for the purpose of generating dynamic security codes on the finished cards is preferred.

Figure 2:
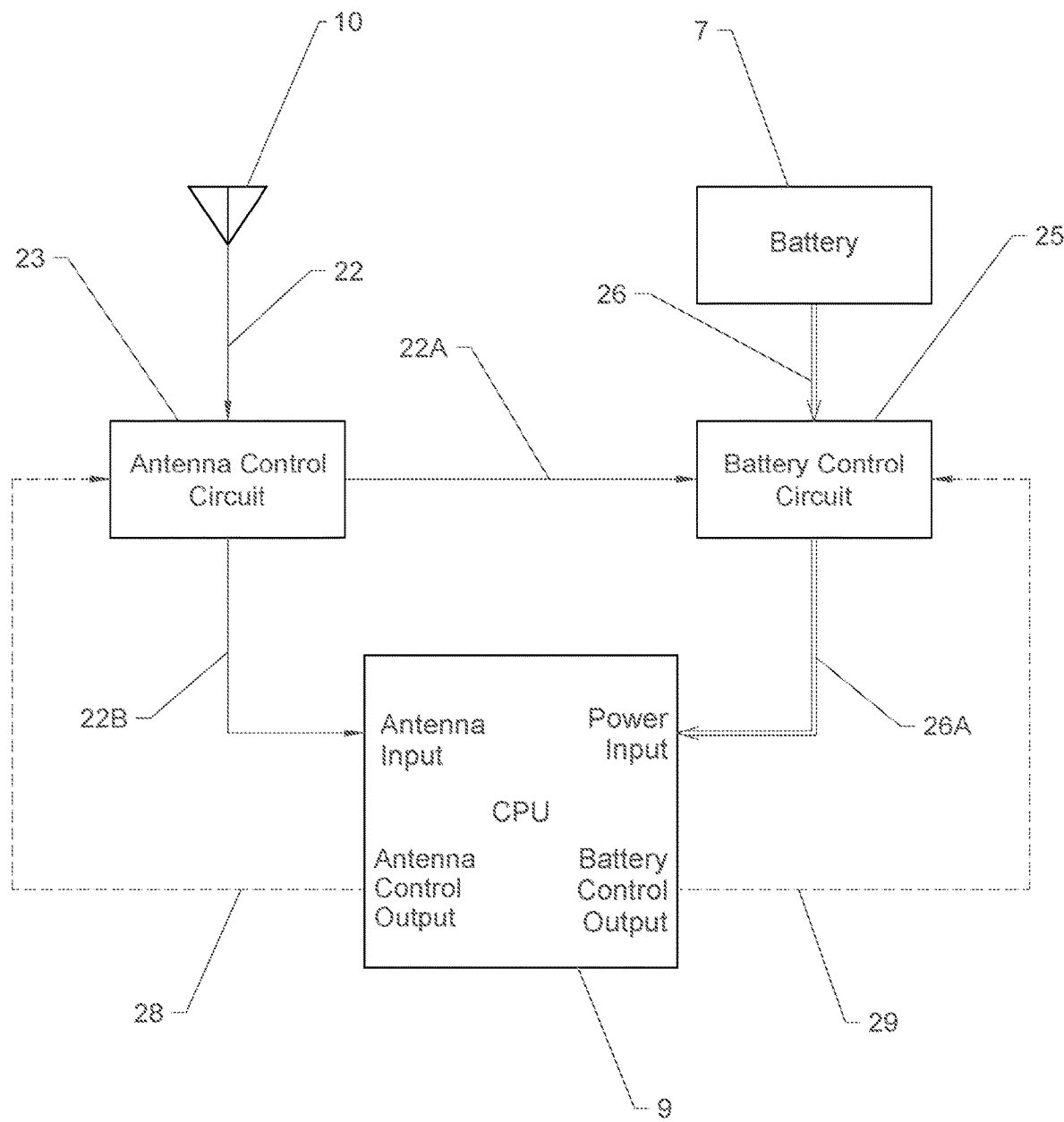
FIG. 2 is a simplified circuit diagram of a circuit useful in the present invention.

In accordance with an especially preferred embodiment of the present invention, a simplified circuit is shown in FIG. 2. During the personalization process, after loading personal data on the payment module, the card will be entered into an RF field. Antenna (10) will generate a voltage in response to the field. The resulting signal will flow from antenna (10) to antenna control circuit (23) via conductor (22). Antenna control circuit (23) is initially in a state that allows the signal to flow to battery control circuit (25) via conductor (22A). Battery (7) is connected to battery control circuit (25) via conductor (26). Battery control circuit (25) is initially in a state that isolates battery (7) from CPU (9). Upon receiving a signal via conductor (12A), the state of the battery control circuit (25) is changed to connect battery (7) to CPU (9) via conductor (26A), thus allowing the CPU to power up and begin logical function. Once on, CPU (9) will control the state of battery control circuit (25) via conductor (29) allowing battery (7) to remain temporarily connected to CPU (9). CPU (9) will, likewise, control the state of antenna control circuit (23) via conductor (28). CPU (9) will change the state of antenna control circuit (23) to redirect the antenna signal from battery control circuit (25) to CPU (9) via conductor (22B). CPU (9) will then interpret additional RF signals sent by the personalization device (not shown) that identify the personalization device. If CPU (9) interprets the personalization device to be legitimate, it will further maintain the states of both antenna control circuit (23) and battery control circuit (25). If CPU (9) determines that the RF signal is not from a legitimate personalization device, it will revert antenna control circuit (23) and battery control circuit (25) to their initial states. In the event that CPU (9) determines the RF signal to be from a legitimate personalization device CPU (9) will accept personalization data from the personalization device to be loaded into CPU (9). Personalization data may include but is not limited to:

Encryption keys used to access secure memory areas of the CPU;
Secret keys used in the calculation of dynamic security codes;
Synchronization of the CPU clock to the dynamic security code authentication system;
Counter start values that may be used in the calculation of dynamic security codes.

Once the personalization data and personalization process has been validated by the personalization device, CPU (9) will change the state of antenna control circuit (23) such that it is disconnected from both battery control circuit (25) and CPU (9). Additionally, battery control circuit (25) will be permanently set to maintain battery (7) connection CPU (9).

Other functionality is also contemplated.

Antenna control circuit (13) and battery control circuit (25) will preferably be designed so that power is only consumed to change the state of the circuits, not to maintain their states.

CPU (9) can be programmed to accept signals from antenna (10) used to initiate self-diagnostic software useful for quality control processes use during both the manufacturing. Once such quality control processes are complete, CPU (9) will change the state of antenna control circuit (23) and battery control circuit (25) to their initial states.

While the present invention has been described herein with reference to certain preferred embodiments, these embodiments have been presented by way of example only, and not to limit the scope of the invention. Additional embodiments thereof will be obvious to those skilled in the art having the benefit of this disclosure. Further modifications are also possible in alternative embodiments without departing from the inventive concepts disclosed herein.

Accordingly, it will be readily apparent to those skilled in the art that still further changes and modifications in the actual concepts described herein can readily be made without departing from the spirit and scope of the disclosed inventions.

What is claimed is:
1. An electronic core for an electronic card, comprising:
a power source;
an initialization antenna which is configured for activating and personalizing the electronic core;
an antenna control electrical circuit which controls the function of the initialization antenna;

a power control electrical circuit which controls the function of the power source;
a central processing unit ("CPU") powered by the power source;
wherein once the power source is electrically connected to the CPU, the CPU will control a diagnostic operation state of the antenna control electrical circuit which sends a diagnostic signal to the CPU when an external energy field causes the antenna control electrical circuit to generate the diagnostic signal, and the CPU initiates a self-diagnostic software program in response to receipt of the diagnostic signal;
wherein the power control electrical circuit is configured so that when it is in an initial power state the power source is in an off power state and the power source will not switch to an on power state until the power control electrical circuit receives an activation signal from the antenna control electrical circuit;
wherein the antenna control electrical circuit is configured so that when it is in an initial antenna control state the antenna control electrical circuit will send the activation signal to the power control electrical circuit when the external energy field causes the antenna control electrical circuit to generate the activation signal; and
wherein the initialization antenna is configured for activating and personalizing the electronic core and is not configured for use with payment transactions.

2. The electronic core of claim 1, wherein the external energy field is a radio frequency field.

3. The electronic core of claim 1, wherein the power source control electrical circuit is configured so that once it receives the activation signal from the antenna control electrical circuit it will electrically connect the power source to the CPU.

4. The electronic core of claim 3, wherein once the power source is electrically connected to the CPU, the CPU will control a second operation state of the power source control electrical circuit which maintains power from the power source to the CPU.

5. The electronic core of claim 4, wherein once the power source is electrically connected to the CPU, the CPU will control a second operation state of the antenna control electrical circuit which sends a personalization signal to the CPU when the external energy field causes the antenna control electrical circuit to generate the personalization signal.

6. The electronic core of claim 1, wherein once the self-diagnostic software program is complete, the CPU will cause the power control electrical circuit to revert to the initial power state and the antenna control electrical circuit to revert to the initial antenna control state.

7. The electronic core of claim 1, wherein the initialization antenna is configured for activating and personalizing the electronic core and is not configured for use with payment transactions.

8. An electronic core for an electronic card, comprising:
a rear adhesive layer configured to form a rear top planar surface and a rear bottom planar surface;
a front adhesive layer configured to form a front top planar surface and a front bottom planar surface; and
an interactive core configured within the rear top planar surface and the front bottom planar surface, wherein said interactive core is comprised of:
a stiffening spacer configured with an interior opening surrounded by an outer edge border located between the rear top planar surface and the front bottom planar surface;
a printed circuit board ("PCB") configured within the interior opening;
a power source configured within the interior opening;
a central processing unit ("CPU") electronically connected to the PCB which is powered by the power source;
an initialization antenna which is configured for activating and personalizing the electronic core;
a thermosetting polymeric material configured within the interior opening between the rear top planar surface and the front bottom planar surface;
a first electrical circuit which controls the function of the initialization antenna; and
a second electrical circuit which controls the function of the power source;
wherein the electronic core is configured so that it has an outer surface shape defined by the rear bottom planar surface, the front top planar surface and the outer edge border;
wherein the second electrical circuit is configured so that the power source is initially in an off power state and will not switch to an on power state until activated by the first electrical circuit; and
wherein the first electrical circuit is configured so that it is activated by an external energy field to generate a signal to the second electrical circuit to switch the power source to the on power state; and
wherein once the power source is electrically connected to the CPU, the CPU will control a diagnostic operation state of the first electrical circuit which sends a diagnostic signal to the CPU when the external energy field causes the first electrical circuit to generate the diagnostic signal, and the CPU initiates a self-diagnostic software program in response to receipt of the diagnostic signal.

9. The electronic core of claim 8, wherein the stiffening spacer is comprised of a non-interactive spacer and an antenna inlay.

10. The electronic core of claim 9, wherein the initialization antenna is configured for activating and personalizing the electronic core and is not configured for use with payment transactions.

11. The electronic core of claim 8, wherein an initialization antenna is configured within the PCB.

12. The electronic core of claim 11, wherein the initialization antenna is configured for activating and personalizing the electronic core and is not configured for use with payment transactions.

13. The electronic core of claim 8, wherein the first electrical circuit and the second electrical circuit are configured so that power is only consumed to change said electrical circuits from one state to another state, not to maintain their states.

14. The electronic core of claim 8, wherein the initialization antenna is configured for activating and personalizing the electronic core and is not configured for use with payment transactions.

* * * * *